United States Patent [19]
Edwards et al.

[11] Patent Number: 5,891,560
[45] Date of Patent: Apr. 6, 1999

[54] FIBER-REINFORCED COMPOSITE AND METHOD OF MAKING SAME

[75] Inventors: Christopher Michael Edwards, Buxton, United Kingdom; Edward Louis d'Hooghe, Hulst, Netherlands

[73] Assignee: The Dow Chemical Company, Midland, Mich.

[21] Appl. No.: 888,340

[22] Filed: Jul. 2, 1997

[51] Int. Cl.$^6$ .................................................. D04H 1/04
[52] U.S. Cl. ................... 428/295; 427/434.6; 428/245; 428/253; 428/255; 523/210; 523/214; 524/494
[58] Field of Search ................... 523/210, 214; 524/494; 428/245, 253, 255, 295; 427/434.6

[56] References Cited

U.S. PATENT DOCUMENTS

| | | |
|---|---|---|
| 3,742,106 | 6/1973 | Price . |
| 3,755,061 | 8/1973 | Schurb . |
| 3,940,464 | 2/1976 | Davis et al. . |
| 3,993,726 | 11/1976 | Moyer . |
| 4,025,257 | 5/1977 | Sagane et al. . |
| 4,037,011 | 7/1977 | Hattori et al. . |
| 4,058,581 | 11/1977 | Park . |
| 4,312,917 | 1/1982 | Hawley . |
| 4,385,133 | 5/1983 | Alberino et al. . |
| 4,439,387 | 3/1984 | Hawley . |
| 4,522,975 | 6/1985 | O'Connor et al. . |
| 4,559,262 | 12/1985 | Cogswell et al. . |
| 5,019,450 | 5/1991 | Cogswell et al. . |
| 5,167,899 | 12/1992 | Jezic . |
| 5,632,838 | 5/1997 | Weidner . |

FOREIGN PATENT DOCUMENTS 1302048  1/1973  United Kingdom .

OTHER PUBLICATIONS

D'Hooghe, Edward L., Applicant's Admission: Polymer Composites, Inc. sells a TPU–containing tape that is less than 0.2 mm thick, and about 2.5 cm wide (Jun. 17, 1997).

Encyclopedia of Polymer Science and Engineering, $2^{nd}$ Edition, vol. 4, John Wiley and Sons, New York, pp. 1–28 (1986).

*Primary Examiner*—Edward J. Cain

[57] ABSTRACT

Fiber-reinforced composites prepared from a depolymerizable and repolymerizable polymer have the processing advantages of a thermoset without being brittle. Impregnation of polymer into the fiber bundle can be achieved with ease, while still producing a composite with excellent physical properties and high damage tolerance.

11 Claims, 3 Drawing Sheets

FIBER-REINFORCED COMPOSITE AND METHOD OF MAKING SAME

BACKGROUND OF THE INVENTION

This invention relates to a fiber-reinforced composite. Processes are known for producing a fiber-reinforced composite by drawing fibers into a pultrusion device, impregnating the fibers with resin, and simultaneously forming and curing the structure in a heated die. (See *Encyclopedia of Polymer Science and Engineering*, $2^{nd}$ Edition, Vol. 4, John Wiley & Sons, New York, pp. 1–28 (1986).) Inasmuch as low melt viscosity is required for efficient resin impregnation (a necessary requisite for acceptable properties of the composite), thermosets have been used in preference to thermoplastic materials. Although thermoset composites have excellent mechanical properties, they suffer from several disadvantages: Thermoset matrices have relatively limited elongation, the thermoset precursors are a source of undesirable volatile organic compounds (VOCs), the composites cannot be reshaped or recycled, and their production rates are limited.

In recent years, efforts have been directed toward making composites using thermoplastic materials. For example, Hawley in U.S. Pat. No. 4,439,387, incorporated herein by reference, teaches the extrusion of molten thermoplastic resin material through a die which imbeds the fibers. In U.S. Pat. No. 4,559,262, Cogswell et al., incorporated herein by reference, discloses a fiber-reinforced composition that is obtained by drawing a plurality of fibers continuously through an impregnation bath, which is a static melt of a thermoplastic polymer of sufficiently low molecular weight (resulting in lower melt viscosity) to adequately wet the fibers. Suitable polymers taught by Cogswell et al. include thermoplastic polyesters, polyamides, polysulfones, polyoxymethylenes, polypropylene, polyarylene sulfides, polyphenylene oxide/polystyrene blends, polyetheretherketones and polyetherketones. Cogswell et al. also teaches that in order to achieve acceptable physical properties in the reinforced composition, it is preferred that the melt viscosity be in excess of 1 $Ns/m^2$. Thus, if the molecular weight of the thermoplastic resin is low enough to achieve sufficiently low melt viscosity to process the resin, the properties of the resultant composite suffer.

The thickness of a single ply of the fiber-reinforced sheet (or tape) is limited by the processes of the prior art. For example, Cogswell et al. teaches single-ply tape thicknesses around the order of 0.1 mm (col. 21, lines 29–31, and col. 22, lines 29–30). In order to achieve a thicker tape, several tapes have to be stacked and compression molded (col. 22, lines 33 to 48.)

In principle, thermoplastic composites would solve many of the problems associated with thermosets. For example, unlike thermosets, thermoplastics can be reshaped, welded, staked, or thermoformed. Furthermore, thermoplastics are generally tougher, more ductile, and have greater elongation than thermosets. Unfortunately, composites prepared by imbedding fibers in a typical thermoplastic resin suffer from a number of disadvantages. First, as previously noted, low molecular weight resins are required to achieve the low viscosities necessary for processability. Second, complete impregnation generally requires slow haul-through rates. Third, the static impregnation bath can cause the polymer melt to be hot for an unduly long time, resulting ultimately in polymer degradation. Fourth, the shape and size of the final composite is limited. For example, the thickness of a single ply of a thermoplastic composite tape is generally not greater than about 0.1 mm, and the length of the composite is limited to not greater than about 100 mm.

There is a need to balance processability of the thermoplastic resin with the final physical properties of the composite. It would be desirable, therefore, to have a fiber-reinforced composite prepared using a thermoplastic resin that has a sufficiently low melt viscosity to adequately wet the fiber. At the same time, it would be desirable that the resin not be limited by molecular weight restrictions as a means of achieving low melt viscosity, so that the composite prepared using such a resin exhibits improved physical properties as compared to the thermoplastic composites prepared as described in the art. It would also be an advance in the art to eliminate the static impregnation bath with an impregnation means that does not require that the melt be exposed to advanced temperatures for an unduly long time. Finally, it would be desirable to prepare longer composite tapes or articles that have single-ply thicknesses of greater than 0.2 mm, preferably greater than 0.5 mm, thereby eliminating the need of a compression-molding step to build thickness

SUMMARY OF THE INVENTION

The present invention addresses a need in the art by providing a fiber-reinforced thermoplastic composite comprising a depolymerizable and repolymerizable thermoplastic polymer resin, and at least 30 percent by volume of reinforcing fibers that are impregnated by the polymer resin and extend through the length therethrough, with the proviso that the fibers are greater than 100 mm long, and have a single-ply thickness of at least 0.2 mm.

In a second aspect, the present invention is a process for preparing a fiber-reinforced rigid thermoplastic polyurethane composite by the steps of drawing a fiber bundle continuously through a melt obtained by heating a rigid thermoplastic polyurethane that contains a hydrolytically- and thermally-stable catalyst, to a temperature sufficient to depolymerize the thermoplastic polyurethane; impregnating the drawn fiber bundle with the depolymerized thermoplastic polyurethane to form a composite melt; forming the composite melt into an article having a thickness of at least 0.2 mm; then cooling the composite melt to repolymerize the thermoplastic polyurethane, wherein the fiber constitutes at least 50 volume percent of the total volume of the composite.

In a third aspect, the present invention is an improved method for preparing a fiber-reinforced composite by pultrusion, which method includes a step of impregnating a fiber bundle with a melt of a polymer, the improvement comprising flowing the melt through a heated conduit having a substantially longitudinal slot suitable for passage of the fiber bundle in a transverse direction of the flow of the melt; and passing the fiber bundle through the slot so that the melt substantially completely impregnates the fiber bundle.

The present invention addresses a problem in the art by providing a thermoplastic that has sufficiently low melt viscosity at advanced temperatures to effectively impregnate the fiber bundle, without limiting the molecular weight of the thermoplastic. In a preferred aspect of the present invention, the need for a hot reservoir of polymer melt is eliminated by contacting fiber with a flowing stream of the hot melt. Thus, undesirable degradation of polymer is reduced.

DETAILED DESCRIPTION OF THE INVENTION

The depolymerizable and repolymerizable thermoplastic polymer (DRTP) can be impregnated into a fiber bundle to form a fiber-reinforced composite by any suitable means, preferably, by pultrusion processes that are well-known in the art. Preferably, the impregnation process is carried out using a combination of pultrusion of fiber and extrusion of a polymer resin melt in accordance with the process illustrated in FIG. 1. It is to be understood that the process can be used for the impregnation of a fiber bundle with any flowable resin, not just the DRTP.

Figure 1:
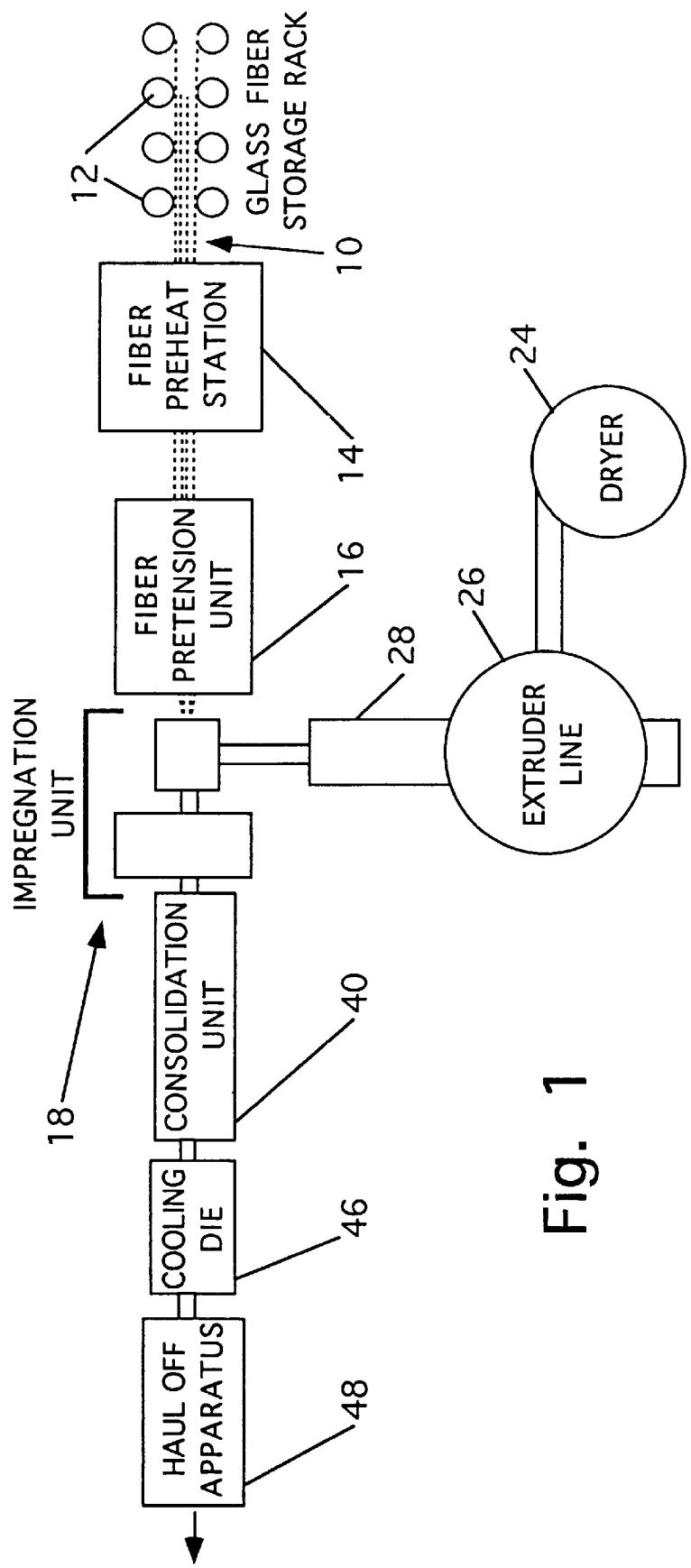
FIG. 1 is a schematic of a preferred pultruder/extruder apparatus that is used to prepare a fiber-reinforced thermoplastic composite.

Referring now to FIG. 1, fiber bundle (10) from a fiber storage rack (12) is pulled through a fiber preheat station (14), which contains infrared ceramic heaters. Fiber bundle (10) may be composed of any of a number of different types of materials including glass, carbon, aramid fibers, ceramics, and various metals. The preheat station is sufficiently hot to remove any water present in the fibers, and to preheat the fibers to a temperature above the solidification point of the resin melt. The fiber bundle (10) is then pulled through a fiber pretension unit (16), which is an array of pins that spreads out the individual fibers and places them under tension, then pulled through an impregnation unit (18), where the fiber bundle is wetted with resin melt.

The resin melt is preferably prepared in the following manner. Solid resin is granulated, then dried in a dehumidifier (24) to not more than 200 ppm water, more preferably not more than 100 ppm water. The dehumidified granulated resin is then advantageously extruded through a heated single-screw extruder (26), which melts the resin by way of shear and heat. The resin melt is then transported by way of a heated resin channel (28) to the impregnation unit (18).

Figure 2:
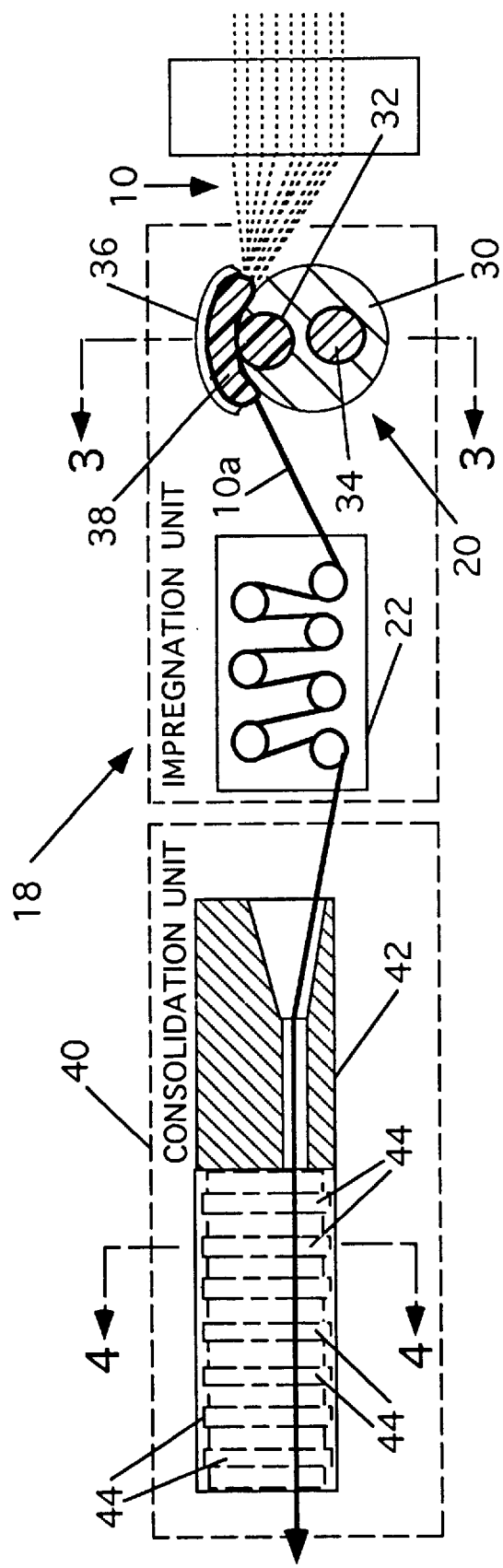
FIG. 2 is an exploded view of an impregnation unit and a consolidation unit of the pultruder/extruder apparatus.
Figure 3:
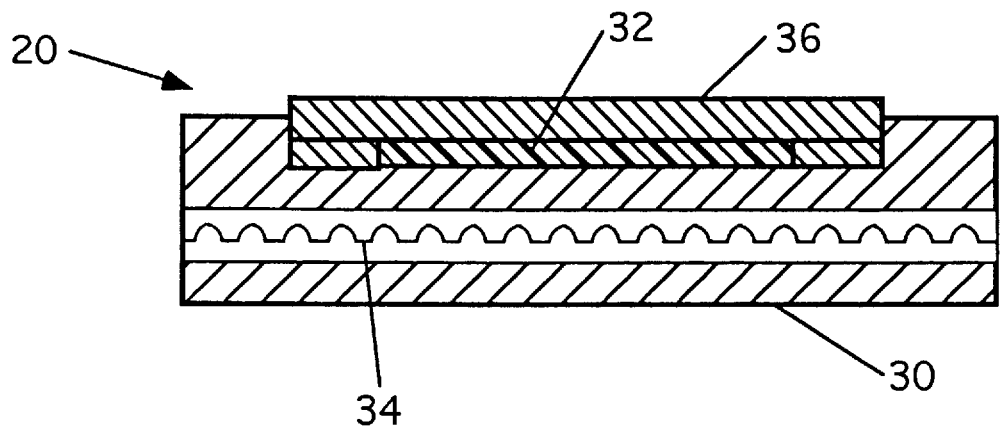
FIG. 3 is a side view of an impregnation pin.

Referring now to FIG. 2, the impregnation unit (18) contains at least one impregnation pin (20) and a series of rods (22). The impregnation pin (20) comprises a substantially cylindrical member (30), which contains: a) two longitudinal channels, a first channel for resin melt transfer (32), and a second channel for a cartridge heater (34), which keeps the impregnation pin (20) heated to a temperature above the melting point of the resin, or in the case of the DRTP, above the temperature at which depolymerization occurs, preferably in the range of from about 200° C. to about 300° C.; and b) a slot formed by mounting an elongated member (36) above a longitudinal opening in the impregnation pin (20) coincident with the first channel (32). The longitudinal opening at the top of the impregnation pin (20) provides a means for the resin melt to contact the fiber bundle (10), which is being pulled through the slot in a substantially transverse direction to the flow of the resin melt through the first channel. The contact of the melt and the bundle are depicted as 38 in FIG. 2.

It is to be understood that the term "opening at the top" is used for convenience and is by no means intended to limit the design of the impregnation pin. Furthermore, the creation of a slot through which the fiber bundle (10) can pass and be contacted with resin can be done in a variety of ways, such as by milling a hollow cylinder lengthwise.

Figure 4:
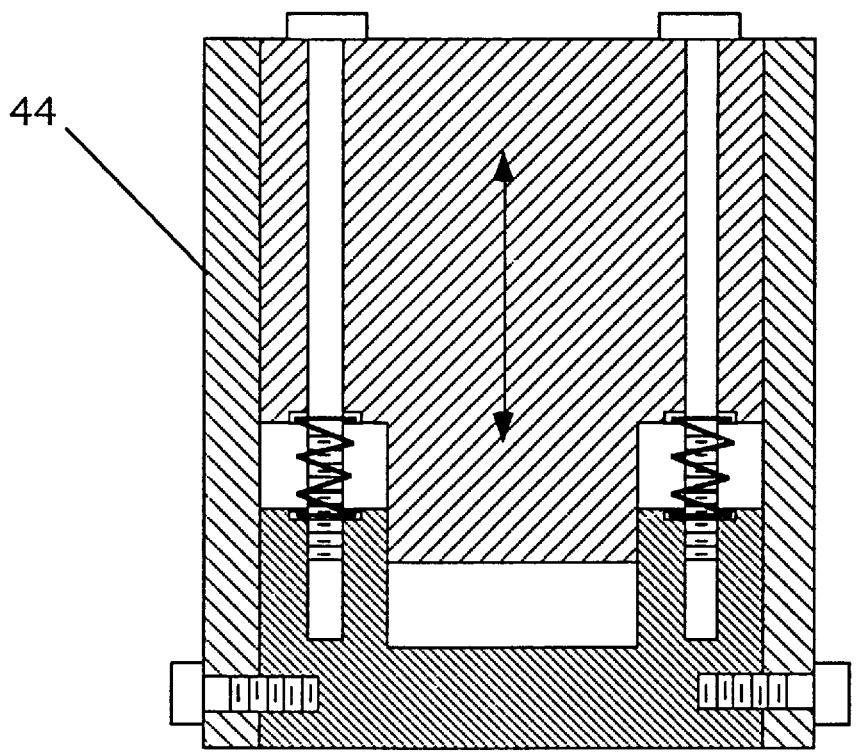
FIG. 4 is a preferred design of a wipe-off plate.

After the fiber bundle (10) is pulled through the slot of the impregnation pin (20) and wetted with the resin melt, the wetted fiber bundle (10a) is woven through a series of wet-out rods (22) to facilitate impregnation of resin. The impregnated fiber bundle (10a) is pulled through the consolidation unit (40), which contains a die (42), which initially shapes the fiber bundle (10a), and a plurality of wipe-off plates (44), which further shape the bundle (10a) into the desired article, and which remove excess melt, and consequently improve impregnation. Each wipe-off plate (44) has an opening with the shape of the part that is to be formed. The dimensions of the opening become smaller further downstream of the impregnation unit (18) until the desired dimensions of the section that is to be formed is reached. FIG. 4 illustrates a preferred design of the wipe-off plates (44).

Referring again to FIG. 1, the composite section is pulled through a cooling die (46), which solidifies the melt and provides a smooth surface. The cooling die (46) is designed to have the dimensions of the article to be formed. The completed article is preferably pulled by a caterpillar-type haul off machine (48). The fibers, which are preferably aligned substantially parallel to each other, constitute at least about 30 volume percent, preferably at least about 50 volume percent, and more preferably at least about 65 volume percent of the total volume of the completed fiber-reinforced composite article, and the reinforcing fibers extend substantially through the length of the composite. The pultruded sections can be cut to any desired length, from millimeters to kilometers, and further shaped, formed, or joined using techniques well known in the art, including thermoforming, hot stamping, and welding. Surprisingly, the preferred process of the present invention provides a means of preparing a composite having a single-ply thickness of at least 0.2 mm, preferably at least 1 mm, more preferably at least 2 mm, and most preferably at least 5 mm.

The preferred class of polymers for the fiber-reinforced composite are thermoplastic polymers which depolymerize upon heating and repolymerize upon cooling. Examples of such thermoplastic polymers include polymers having the following structural unit:

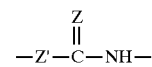

where Z is S or O, preferably O, and Z' is S, O, N-alkyl or NH, preferably O or NH, more preferably O. Preferred DRTPs are thermoplastic polyurethanes and thermoplastic polyureas, preferably thermoplastic polyurethanes.

The DRTP is a single- or two-phase polymer that can be prepared by the reaction of approximately stoichiometric amounts of: a) a diisocyanate or a diisothiocyanate, preferably a diisocyanate; b) a low molecular weight compound (not more than 300 Daltons) having two active hydrogen groups; and c) optionally, a high molecular weight compound (molecular weight generally in the range of from about 500 to about 8000 Daltons) with two active hydrogen groups. The low molecular weight compound, in combination with the diisocyanate or diisothiocyanate, contributes to what is known as the "hard segment content", and the high molecular weight compound, in combination with the diisocyanate or diisothiocyanate, contributes to what is known as the "soft segment content".

As used herein, the term "active hydrogen group" refers to a group that reacts with an isocyanate or isothiocyanate group as shown:

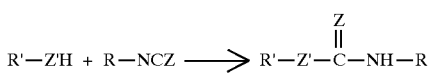

where Z and Z' are as previously defined, and R and R' are connecting groups, which may be aliphatic, aromatic, or cycloaliphatic, or combinations thereof.

The compound with two active hydrogens may be a diol, a diamine, a dithiol, a hydroxy-amine, a thiol-amine, or a hydroxy-thiol, preferably a diol.

The DRTP can be rigid or soft. Soft DRTPs, preferably thermoplastic polyurethanes (STPUs), are characterized by having a Shore A hardness of not more than 95 or a $T_g$ of not more than 25° C. Rigid DRTPs, preferably rigid thermoplastic polyurethanes (RTPUs), have a glass transition temperature ($T_g$) of not less than 50° C. and typically have a hard segment content of at least 75 percent. The disclosure and preparation of RTPUs is described, for example, by Goldwasser et al. in U.S. Pat. No. 4,376,834, which teachings are incorporated herein by reference. RTPUs are preferred thermoplastic polymers for the composites of the present invention. Such RTPUs are commercially available under the trade name ISOPLAST™ engineering thermoplastic polyurethanes (a trademark of The Dow Chemical Company).

Preferred diisocyanates include aromatic, aliphatic, and cycloaliphatic diisocyanates and combinations thereof. Representative examples of these preferred diisocyanates can be found in U.S. Pat. No. 4,385,133; 4,522,975; and 5,167,899, which teachings are incorporated herein by reference. Preferred diisocyanates include 4,4'-diisocyanato-diphenylmethane, p-phenylene diisocyanate, 1,3-bis(isocyanatomethyl)cyclohexane, 1,4-diisocyanato-cyclohexane, hexamethylene diisocyanate, 1,5-naphthalene diisocyanate, 3,3'-dimethyl-4,4'-biphenyl diisocyanate, 4,4'-diisocyanato-dicyclohexylmethane, and 2,4-toluene diisocyanate. More preferred are 4,4'-diisocyanato-dicyclohexylmethane and 4,4'-diisocyanato-diphenylmethane. Most preferred is 4,4'-diisocyanatodiphenylmethane.

Preferred low molecular weight compounds having two active hydrogen groups are ethylene glycol, 1,3-propanediol, 1,4-butanediol, 1,5-pentanediol, 1,6-hexanediol, diethylene glycol, triethylene glycol, tripropylene glycol, tetraethylene glycol, neopental glycol, 1,4-cyclohexanediol, 1,4-cyclohexanedimethanol, 1,4-(bishydroxyethyl)-hydroquinone, 2,2-bis(P-hydroxy-4-ethoxyphenyl)propane (i.e., ethoxylated bisphenol A), and mixtures thereof. More preferred chain extenders are 1,4-butanediol, 1,6-hexanediol, 1,4-cyclohexanedimethanol, diethylene glycol, triethylene glycol, tripropylene glycol, and mixtures thereof.

The DRTP may optionally contain structural units formed from a high molecular weight compound having two active hydrogen groups, which is preferably a glycol having a molecular weight in the range of preferably not less than about 750, more preferably not less than about 1000, and most preferably not less than about 1500; and preferably not more than about 6000, and more preferably not more than about 5000. These high molecular weight glycol units constitute a sufficiently low fraction of the DRTP, preferably the RTPU, such that the $T_g$ of the DRTP is above 50° C. Preferably, the high molecular weight glycol units constitute not more than about 25, more preferably not more than about 10, and most preferably not more than about 5 weight percent of the RTPU, to about 0 weight percent of the RTPU.

The high molecular weight glycol is preferably a polyester glycol or a polyether glycol or a combination thereof.

Examples of preferred polyester glycols and polyether glycols include polycaprolactone glycol, polyoxyethylene glycol, polyoxypropylene glycol, polyoxytetramethylene glycol, polyethylene adipate, polybutylene adipate glycol, polyethylene-butylene adipate glycol, and poly(hexamethylene carbonate glycol), or combinations thereof.

The isocyanate-to-XH ratio of the reactants, preferably OH, varies from about 0.95:1, preferably from about 0.975:1, and more preferably from 0.985:1, to about 1.05:1, preferably to about 1.025:1, and more preferably to about 1.015:1.

The DRTP, preferably the RTPU, is advantageously prepared in the presence of an effective amount of a hydrolytically- and thermally-stable catalyst, which catalyzes the reaction between the isocyanate groups and the active hydrogen groups, preferably the hydroxyl groups, to form urethane, urea, or thiourea linkages, preferably urethane linkages, and remains active during the depolymerization of the polymer to catalyze the re-formation of urethane, urea, or thiourea bonds, preferably urethane bonds, and the rebuilding of molecular weight. Examples of such catalysts are $Sn^{+2}$ such as stannous octoate; and $Sn^{+4}$ catalysts such as dialkyltin dimercaptides, preferably dimethyltin dimercaptide (available as FOMREZTM™ UL-22, a trademark of Witco Chemical), and dialkyltin dicarboxylates, such as those disclosed in detail in U.S. Pat. No. 3,661,887. Preferably, the catalyst is present at an amount from about 0.001 to about 5 weight percent, based on the weight of the reactants.

Thermoplastic resins that are not DRTPs can be used in combination with the DRTP to make the composites of the present invention, provided the non-DRTP is employed at sufficiently low levels that the melt viscosity of the resin remains low enough to efficiently impregnate the fiber bundle. Examples of non-DRTPs include acrylonitrilebutadiene-styrene copolymers, polystyrenes, polyphenylene oxide, polyphenylene oxide polystyrene blends, polyoxymethylenes, polypropylene, polyamides, poly(butylene terephthalate), poly(ethylene terephthalate), polyester copolymers of poly(butylene terephthalate) and poly(ethylene terephthalate), styrene-acrylonitrile copolymers, and ethylene-propylene-diene terpolymers.

The composites may also includes additives such as flame retardants, UV stabilizers, pigments, dyes, anti-static agents, antimicrobals, fungicides, demolding agents, and flow promoters.

Reinforced thermoplastic composites can be prepared from the DRTP that have surprisingly superior physical properties as compared to those of composites prepared from thermoplastics that are not depolymerizable and repolymerizable. Moreover, the use of the DRTP, particularly with the preferred apparatus, allows for fast pull rates, preferably at least about 1 m/min, more preferably at least about 2 m/min, more preferably at least 5 m/min, and most preferably at least 10 m/min, without sacrificing degree of impregnation. The preferred composite has a flexural strength of at least 500 MPa, more preferably at least 750 MPa, and most preferably at least 1200 MPa, even when glass fibers are used. Much higher strengths can be achieved using aramid or carbon fibers.

The reinforced composites of the present invention can be used in a wide array of applications that require very high strength and stiffness, and exceptional impact, such as skis, ski poles, mast stays, tent poles, concrete, crash barriers, window or door lineals, cable trays, and cable for optical fibers.

The following example is for illustrative purposes only and is not intended to limit the scope of this invention.

EXAMPLE

Preparation of Glass Fibers Impregnated with a Rigid Thermoplastic Polyurethane Twenty-four tows of fiber (Owens Corning, R43S, 2400 tex) arranged in 3 layers, were pulled through the preheat station at 240° C. ISOPLAST™ 2530 polyurethane engineering thermoplastic resin (a trademark of The Dow Chemical Company) which had been predried at 95° C. for over 8 hours on a Piovan dehumidifying dryer and processed on a Collins single-screw extruder (screw speed 25 rpm, barrel zone temperatures 250° C. (hopper), 260° C., and 270° C.). The connector was set at 280° C. Each layer of fibers was pulled through an impregnation pin, where the fibers were saturated with the polyurethane melt, then weaved through several heated rods. The impregnation pins each have a slot dimension that is 0.8 mm high and 60 mm wide, and a first channel length of 120 mm and a channel diameter of 30 mm. The impregnation pins were maintained at 285° C., and the other rods were maintained at 260° C. Fibers were pulled at a rate of 2 m/min. Strips having a dimension of 2 cm wide by 2 mm thick (and of variable length) were produced. The flexural strength of fiber-reinforced composite was 1300 MPa, and flex modulus was 41 GPa (tested according to BS 2787).

What is claimed is:

1. A process for preparing a fiber-reinforced rigid thermoplastic polyurethane composite article comprising the steps of:

a) drawing a fiber bundle continuously through a melt obtained by heating a rigid thermoplastic polyurethane that contains a hydrolytically- and thermally-stable catalyst, to a temperature sufficient to depolymerize the thermoplastic polyurethane;

b) impregnating the drawn fiber bundle with the depolymerized thermoplastic polyurethane to form a composite melt;

c) forming the composite melt into an article having a thickness of at least 0.2 mm; then d) cooling the composite melt to repolymerize the thermoplastic polyurethane; wherein the fiber constitutes at least 50 volume percent of the total volume of the composite.

2. The method of claim 1 wherein in step (b), the fibers are impregnated by flowing the polyurethane through a heated conduit having a substantially longitudinal slot suitable for passage of the fiber bundle in a transverse direction of the flow of the resin; and passing the fiber bundle through the slot so that the resin impregnates the fiber bundle.

3. In an improved method for preparing a fiber-reinforced composite by pultrusion, which method includes a step of impregnating a fiber bundle with a melt of a polymer, the improvement comprising flowing the melt through a heated conduit having a substantially longitudinal slot suitable for passage of the fiber bundle in a transverse direction of the flow of the melt; and passing the fiber bundle through the slot so that the melt substantially completely impregnates the fiber bundle.

4. The method of claim 3 wherein the conduit having a substantially longitudinal slot comprises an elongated member mounted above an elongated and substantially cylindrical receptacle.

5. The method of claim 3 wherein the polymer is thermoplastic.

6. The method of claim 3 wherein the polymer is a thermoset.

7. The method of claim 5 wherein the thermoplastic polymer is depolymerizable and repolymerizable.

8. The method of claim 7 wherein the depolymerizable and repolymerizable thermoplastic polymer contains structural units of the formula:

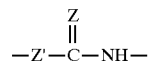

where Z is S or O; and Z' is S, O, or NH.

9. The method of claim 8 wherein Z and Z' are O.

10. The method of claim 7 wherein the thermoplastic polymer is a thermoplastic polyurethane having a $T_g$ of at least 50° C.

11. The method of claim 10 wherein the melt of the polymer further includes a polymer that is not depolymerizable and repolymerizable.

* * * * *